Figure 1:
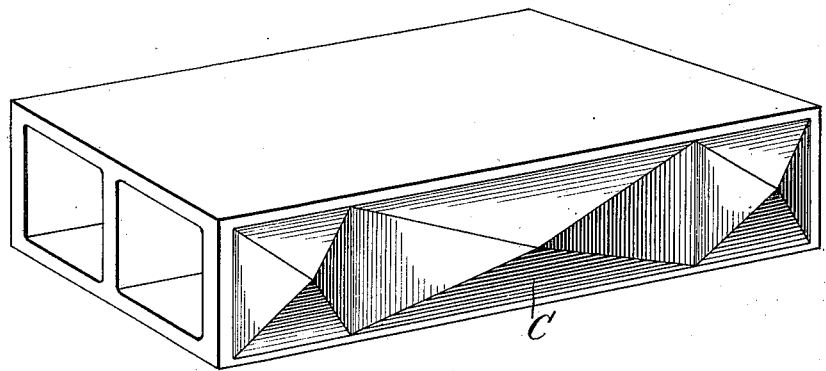

No. 624,563. Patented May 9, 1899.
C. W. STEVENS.
PROCESS OF MAKING ARTIFICIAL STONE.
(Application filed Nov. 12, 1897.)
(No Model.) 2 Sheets—Sheet 1.

Witnesses.
Inventor
Chas. W. Stevens

No. 624,563. Patented May 9, 1899.
C. W. STEVENS.
PROCESS OF MAKING ARTIFICIAL STONE.
(Application filed Nov. 12, 1897.)
(No Model.) 2 Sheets—Sheet 2.
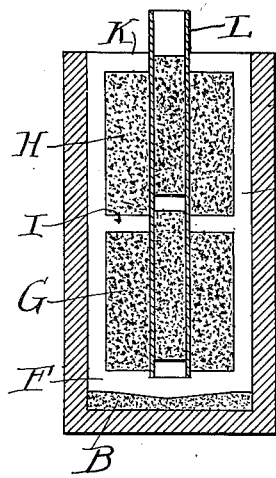
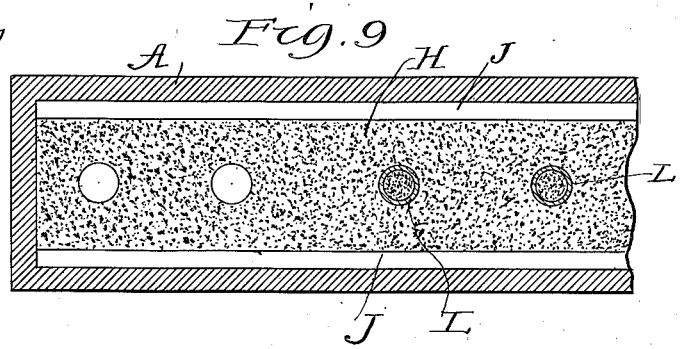
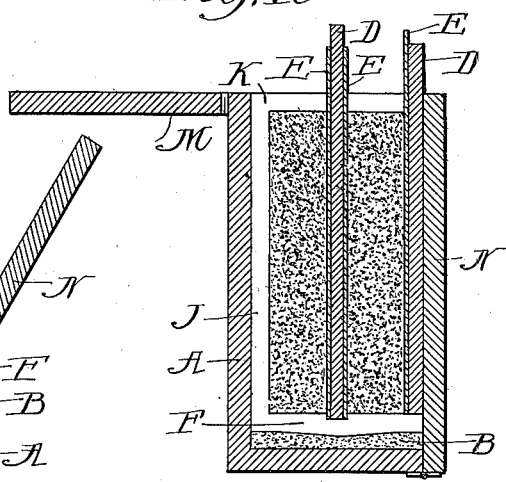
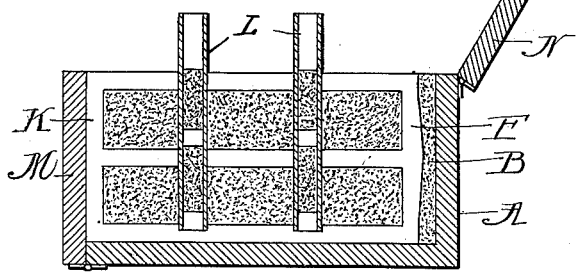
Witnesses
Inventor
Chas. W. Stevens

UNITED STATES PATENT OFFICE.

CHARLES W. STEVENS, OF HARVEY, ILLINOIS.

PROCESS OF MAKING ARTIFICIAL STONE.

SPECIFICATION forming part of Letters Patent No. 624,563, dated May 9, 1899.

Application filed November 12, 1897. Serial No. 658,273. (No specimens.)

*To all whom it may concern:*

Be it known that I, CHARLES W. STEVENS, a citizen of the United States, residing at North Harvey, in the county of Cook and State of Illinois, have invented certain new and useful Improvements in Processes of Making Artificial Stone, of which the following is a full, clear, and exact description, reference being had to the accompanying drawings, forming a part of this specification.

This invention relates to improvements in the processes for the manufacture of artificial stone, and particularly to that class exemplified by Letters Patent of the United States No. 583,515, granted to me June 1, 1897.

The object of the present invention, generally stated, is the same as the object of the invention disclosed in the said Letters Patent—to wit, the production of either plain or ornamental artificial stone in the place where it is to be permanently used or in a factory from whence it is distributed for use.

The object of the present invention, more specifically stated, is an improvement in the processes for manufacturing artificial stone, whereby either solid or hollow, plain or ornamented artificial stone may be produced, adaptable for any building purposes, such as cornices, courses, fronts, or any other purpose to which natural stone is generally applied in building, and at the minimum cost, both of material and workmanship, and of such simplicity as to dispense with the employment of skilled labor.

The process described in my former patent above mentioned is what I have designated as the "dry" process, the stone-producing compound being therein molded and manipulated in a dry powdered form in the molding operation and subsequently saturated with water. In my present invention, which I have designated as the "wet" process, the stone-producing compound is molded and manipulated in a wet or plastic state, and the final step of saturation of both the compound and the molding-sand is dispensed with, the molding-sand in my present invention being comparatively dry and relied upon to extract or absorb the moisture from the stone compound.
In carrying out my process any suitable form of apparatus may be employed; but I have found by practice that the apparatus illustrated in the accompanying drawings possesses many advantages over any other apparatus known to me.
I will therefore describe and illustrate my said novel apparatus in connection with my process as the preferred form of apparatus for carrying out the same, without, however, desiring to in any manner limit my invention to the use of such an apparatus.

In the drawings, Figure 1 represents a perspective view of a typical completed hollow stone as produced by my process. Figs. 2 to 7, inclusive, illustrate one way of using my preferred form of apparatus in carrying out my process, as will be described in detail farther on. Figs. 8 to 11, inclusive, represent detail views illustrating a further use of my invention for producing a superior article of manufacture by my process, as will be described in detail farther on.

While my process is adaptable to the manufacture of any kind, form, or configuration of stone, it is particularly applicable to what is called "hollow stone," resembling in shape the ordinary terra-cotta hollow building-tiles with strengthening cross-webs, for cornice-work, ornamental coursework, entire fronts, and the like, and I will therefore describe my process in detail as employed in the manufacture of such hollow stone, it being understood, of course, that the apparatus, even of my preferred form, must be varied as to dimensions, configuration, and use, according to the article which it is desired to produce.

Referring now to the drawings, I will first say that we will assume the form of hollow stone illustrated in Fig. 1 is sought to be produced by the apparatus in the manner illustrated in Figs. 2 to 7.

Figure 2:
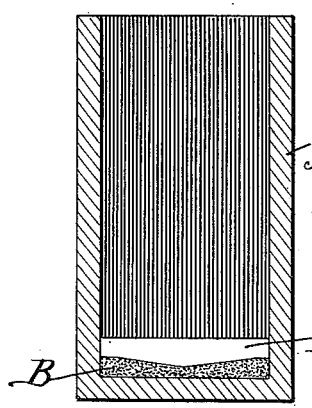
Figure 3:
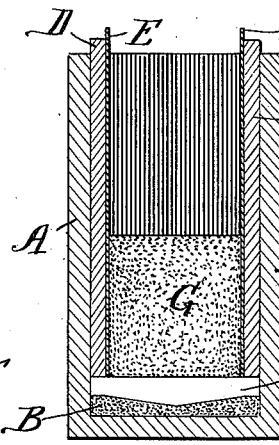
Figure 4:
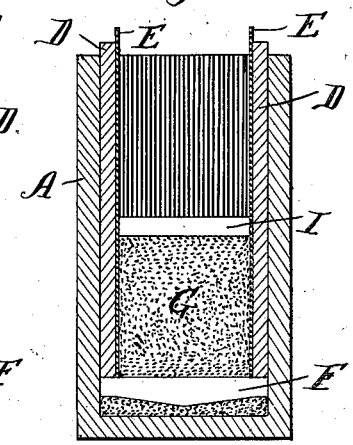
Figure 5:
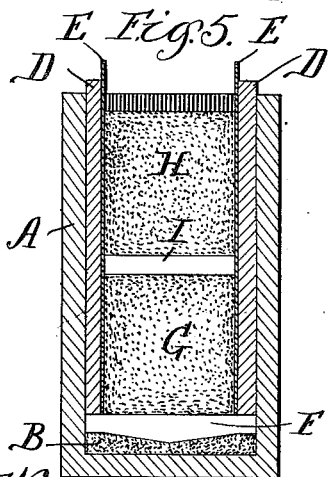
Figure 6:
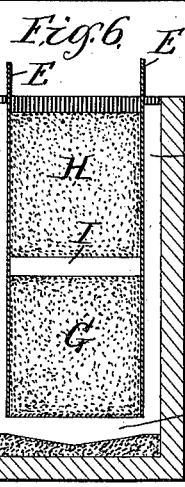
Figure 7:
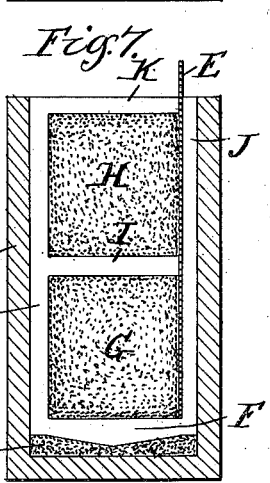

I first take a box A, of suitable dimensions, corresponding to a molder's flask, the inner walls of which I prefer should serve as the faces against which all of the outer plane faces of the stone article shall be molded except the ornamented and opposite faces thereof. In the bottom of this box I place a suitable layer of fine molder's sand of any suitable thickness and in a just sufficiently-moistened condition to hold its form when pressed to any desired shape. In other words, I propose to have this sand as dry as possible for the intended purpose. Into this sand with a suitable pattern I impress the shape of the ornamented face desired—such, for instance, as the face C of the stone illustrated in Fig. 1—which pattern should preferably extend over the entire area of the interior of the box. I next pour into the impression thus made the stone compound in a plastic or semiliquid state, sufficiently wet to flow easily and to a depth corresponding with the desired thickness of the hollow stone. This compound may consist of any stone-producing mixture of materials and may be either colored throughout or mixed to produce a mottled effect or to produce contrasting colors on the face of the ornamental stone, and, in fact, different colors of the compound may be poured to form different parts of the ornamented face. This first manipulation, as far as described, is illustrated in Fig. 2. I next insert the parting-boards D at the vertical sides of the box, which are faced with metallic facing-plates E of suitable form upon the interior of the box. Both the parting-boards and facing-plates rest upon the back or top of the ornamented stone facing and preferably extend a little beyond the upper edges of the box. I then fill in the box, say, to about one-half its depth (or to any other point, according to the number of strengthening-webs desired) with the molding-sand, as at G, in as nearly dry a state as is practicable, and upon this sand filling pour a suitable layer of the stone compound in a plastic or semiliquid state. Figs. 3 and 4 serve to illustrate the use of the apparatus as thus far described. I next fill in with more molding-sand, practically dry, nearly to the top of the box, as illustrated at H in Fig. 5. Having now formed in the sand the ornamented front wall F and the strengthening-web at the center of the hollow stone, I next successively draw out the parting-boards D and pour into the spaces formed by them the stone compound, which flows down to and unites with the front F and the strengthening web or partition I, thereby forming the sides J of the hollow stone, as illustrated in Fig. 6. I next withdraw the facing-plates E, as illustrated in Fig. 7, and fill in to the top of the box with the stone compound, which unites with the sides J and forms the back wall K of the hollow stone. The hollow stone is now completely molded and may now be laid aside for setting or curing in any well-known or desired manner, according to the compound used.

The use of the parting-boards is desirable, as will be readily seen, in order to have a wall to build against and at the same time which may be withdrawn to allow the stone compound to flow in and take its place. The use of the metallic face-plates, in connection with the parting-boards, is also very desirable, because neither the sand nor the stone compound will adhere thereto, as they would to the parting-boards, and hence when withdrawn they leave comparatively sharp and square edges as between the stone material and the molding-sand, thus producing an article of superior finish. I may also say that if found desirable the top layer of stone compound, forming the back K of the hollow stone, may be covered with a sufficient layer of sand to properly aid in the absorption of the moisture from this part of the compound and at the same time protect the same against the direct action of the atmosphere thereon, which might in some cases produce weather-checking.

It will of course be understood that I have herein illustrated and described the simplest form of apparatus and a type of the simplest form of hollow stone which can be produced by my process, and it will of course be understood that in the making of artificial stone of different shapes, contours, and dimensions the box, the parting-boards, and the facing-plates must be modified accordingly, for obviously hollow stone with both ornamented sides and ends or with obliquely or otherwise disposed ornamentation and contour extending in various directions may be produced by my process and apparatus without any variation whatever in the process and practically no variation in the apparatus, excepting that the use of the parting-boards and facing-plates would probably in all cases be limited to the plane surfaces, although that is not absolutely essential, because the blocks may be molded with either top, bottom, sides, or ends uppermost or in an oblique position, according to the particular article being made. I have also found by practical experience that in the molding of either delicate or intricate ornamental designs the best results can be obtained by first filling in the impression of the pattern made in the sand to the depth of about an eighth of an inch with dry stone compound and backing it up with the liquid compound, because the fine lines and sharp edges will be better brought out, the dry powdered stone compound entering the depressions formed by the pattern more perfectly than the plastic or semiliquid compound. I have also found that where it is desirable greater strength may be given the hollow stone, either laterally or longitudinally, than is afforded by the strengthening web or partition formed therein in the molding of the stone by providing posts extending between the exterior walls, either front and back or sides, and also, if desired, between the partitions and the external walls. These posts are formed of the stone compound in the manner about to be described, it being understood that in both cases the posts are formed before the hollow stone is allowed to set or is cured. In other words, I am able to produce by this process an article superior in strength to that produced by any other process and by the use of the same apparatus employed in carrying out the process.

In producing a hollow stone thus strengthened of the form illustrated in Figs. 1 to 8 of the drawings I would take a tube L, preferably metallic, and after the stone is completed, as illustrated in Fig. 7, I would force the tube through both the back wall K and partition I, partly through the front F, and of course through the sand fillings or layers G and H and then withdraw the tube, carrying with it the sand and stone compound by which it will be filled. As many of these holes as desirable may be formed along the length of the stone and then filled with the plastic or semiliquid compound up to a level with the surface of the back wall K. Each post will form a homogeneous union with the back and front walls and the partition, besides extending therebetween, so that when the filling-sand is removed from the stone these posts will serve as braces between the front and rear wall and the partition or strengthening-web. In Fig. 8 I have illustrated a vertical section of the molding-box with the stone complete, showing the manner of using the tube L to form the posts. In Fig. 9 I have illustrated a horizontal section of the same, but showing some posts completed and others with the tubes in place preparatory to making the holes for the posts.

In Figs. 10 and 11 I have shown how a hollow stone formed with its ornamented face down and having a strengthening-web at right angles to the back wall K thereof may be provided with posts extending through such partition or web and between the upper and lower walls or sides of the block parallel with the back wall. In such case I prefer to employ a hinged top M and a hinged side N for the mold-box in order that the posts may be formed through the sides of the hollow stone after the same has been formed face downward or in a position at right angles to that in which the posts are formed. In this apparatus it will be noticed that the parting-board D has a facing-plate E on each side thereof to form the strengthening-web, and it will of course be understood that the same means can be adopted for forming the side walls J, in which case of course the side parting-boards D would be set a suitable distance away from the sides of the box or flask, and a layer of sand would intervene between said boards with their double facings and the sides of the box. The stone will thus be formed by molding the stone compound wholly in sand—that is, with sand on all sides or upon each side of each layer of the compound.

I may here state that while the hollow building-stone may be the more common form in which such stones are produced it is within the purview of my invention to produce solid stone blocks or to produce solid flat or concave tiles for use in ornamental coursework, in which case the apparatus would necessarily consist only of a box of the desired shape and dimensions, for after the impression is made in the sand in the bottom of the box the compound will be poured in to a suitable depth and then backed up by a sufficient layer of sand to properly absorb the moisture.

Having thus fully described my invention, what I claim, and desire to secure by Letters Patent, is—

1. The process of forming artificial stone consisting in molding the stone compound while in a plastic or semiliquid state in or on a mold formed of relatively dry sand and then allow the mass to set until the sand absorbs the surplus moisture from the compound, thereby converting the latter to a solid or non-liquid form, substantially as and for the purpose set forth.

2. The process of forming artificial stone consisting in molding stone compound while in a plastic or semiliquid state, in or on a partial mold formed of relatively dry sand, and then covering the compound with relatively dry sand and finally allowing the mass to set until the sand absorbs the surplus moisture from the compound, thereby converting the latter to a solid or non-liquid form, substantially as and for the purpose set forth.

3. The process of forming artificial stone consisting in molding layers of stone compound while in a plastic or semiliquid state between or on layers of relatively dry sand and then allow the mass to set until the sand absorbs the surplus moisture from the compound, thereby converting the latter to a solid or non-liquid form, substantially as and for the purpose set forth.

4. The process of forming artificial stone consisting in first molding layers of stone compound while in a plastic or semiliquid state between or on layers of relatively dry sand, then removing a portion of such layers of compound and sand and replacing such removed portions with stone compound in a plastic or semiliquid state and finally allowing the mass to set until the sand absorbs the surplus moisture from the compound, thereby converting the latter to a solid or non-liquid form, substantially as and for the purpose set forth.

5. The process of forming artificial stone consisting in first forming in relatively dry sand a partial mold of one or more faces of such stone, next filling into the partial mold thus formed a lining or layer of stone compound in a dry powdered state, then molding thereon a layer of stone compound in a plastic or semiliquid state next covering the compound with relatively dry sand and finally allowing the mass to set until the sand absorbs the surplus moisture from the compound, thereby converting the latter to a solid or non-liquid form, substantially as and for the purpose set forth.

CHARLES W. STEVENS.

Witnesses:
WM. O. BELT,
C. L. WOOD.